United States Patent Office 3,567,458
Patented Mar. 2, 1971

3,567,458
PHOTOGRAPHIC EMULSION CONTAINING A WATER-SOLUBLE ALKYLENE OXIDE BLOCK COPOLYMER AND A MEROCYANINE DYE
Kirby M. Milton, Fishers, N.Y., assignor to Eastman Kodak Company, Rochester, N.Y.
No Drawing. Filed Nov. 15, 1967, Ser. No. 683,107
Int. Cl. G03c 1/10
U.S. Cl. 96—132
18 Claims

ABSTRACT OF THE DISCLOSURE

Photographic emulsions are provided which contain a water-soluble alkylene oxide block copolymer and carboxy-substituted merocyanine dyes.

---

This invention relates to novel photographic silver halide emulsions, and more particularly to new and improved lithographic type silver halide emulsions and to novel photographic elements prepared with such emulsions.

It is known that certain polymeric materials function as development restrainers and increase contrast and improve half-tone dot quality markedly, when incorporated into "lith-type" fine grain high contrast silver halide emulsions containing at least 50 mole percent chloride, less than 40 mole percent bromide and less than 5 mole percent iodide. For example, various alkylene oxide polymers have been proposed for this purpose. However, it has been noted, for instance with ethyleneoxide polymers, that emulsions prepared therewith show undesirable loss in speed as compared with the control. Also, such prior art emulsions have not given evenly spaced time-development H and D curves (see C. E. K. Mees and T. H. James "The Theory of the Photographic Process," chapter 4, The MacMillan Company, 1966) or have not shown the required high contrast and good dot quality uniformly over a wide time-development range. It will be evident, therefore, that there is need in the art for improved "lith-type" emulsions, and elements prepared therewith.

It is, accordingly, an object of this invention to provide new "lith-type" photographic silver halide emulsions. Another object of this invention is to provide novel photographic elements containing at least one layer of lith-type emulsions. A further object of this invention is to provide lith-type emulsions which contain restrainer and have good speed. Other objects of this invention will be apparent from this disclosure and the appended claims.

I have now found that new and greatly improved "lith-type" photographic silver halide emulsions and elements are produced by incorporating into the emulsions a combination of (1) a restrainer such as a water-soluble alkylene oxide block copolymer and (2) a sensitizing dye selected from certain merocyanine dyes. I have further found that the block copolymer restrainers employed in this invention give effective development restraint at a much lower level of restrainer than is normally seen with conventional polyethylene glycol restrainers. Such results indicate that there is an interaction between the block copolymers and the merocyanine dyes of the invention that is not present between polyethylene glycol combinations with the same dyes. This interaction results in the following advantages as compared with prior art "lith-type" silver halide emulsions containing alkylene oxide polymer restrainers, but containing none of the merocyanine dyes of this invention:

(1) High contrast;
(2) High dot quality over a wide development range;
(3) Evenly spaced time-development H and D curves;
(4) Speed loss due to restrainer regained;
(5) Improved compatibility with high sulfite content developers.

The proportions of the alkylene oxide block copolymer (1) and the merocyanine dye (2) used to advantage in the emulsions of the invention may vary over wide limits, since practically any amount of either component in the combinations is beneficial; however, the preferred proportions range from about 20 to 50 mg. of component (1) and from about 50 to 250 mg. of component (2) per mole of silver in the emulsion.

The merocyanine dyes that are useful for preparing the novel and improved lithographic silver halide emulsions and elements of the invention include those comprising first and second 5- to 6-membered nitrogen containing heterocyclic nuclei joined by a double bond or a dimethine linkage; the first of said nuclei being a rhodanine nucleus, a 2-thiohydantoin nucleus or a 2-thio-2,4-oxazolidinedione nucleus containing in each instance a carboxymethyl or carboxyphenyl substitutent on a hetero nitrogen atom thereof, said first nucleus being joined by the 5-carbon atom thereof to said linkage; and, said second nucleus being a sensitizing nucleus of the type used in cyanine dyes joined by a carbon atom thereof to said linkage, to complete said merocyanine dye.

A particularly useful class of merocyanine dyes for preparing the novel and improved lithographic silver halide emulsions and elements of the invention include those represented by the following general formula:

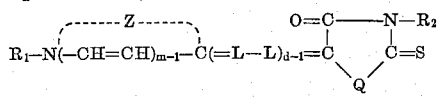

(I)

wherein $m$ and $d$ each represents a positive integer of from 1 to 2; L represents a methine linkage, e.g., —CH=, —C(CH$_3$)=, —C(C$_6$H$_5$)=, etc.; R$_1$ represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups, (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., an alkoxycarbonylalkyl group, e.g., ethoxycarbonylmethyl, β-methoxycarbonylethyl, ω-ethoxycarbonylbutyl, etc., or an aralkyl group, e.g., benzyl, phenethyl, etc.; or an aryl group, e.g., phenyl, tolyl, naphthyl, methoxyphenyl, chlorophenyl, etc.; R$_2$ represents methyl, carboxymethyl, phenyl, carboxyphenyl or alkoxycarbonylmethyl (the alkoxy group preferably being from 1 to 4 carbon atoms) groups, e.g., methoxycarbonylmethyl, β - ethoxycarbonylmethyl, ω-butoxycarbonylmethyl, etc.; Q represents an oxygen, sulfur or selenium atom or the group =NR$_3$; R$_3$ is selected from the group consisting of methyl, phenyl, carboxymethyl and alkoxycarbonylmethyl, said R₃ being (1) phenyl or methyl when R₂ represents carboxymethyl; (2) carboxymethyl when R₂ represents phenyl or methyl; (3) alkoxycarbonylmethyl when R₂ represents carboxyphenyl; and (4) carboxyphenyl when R₂ represents alkoxymethyl; said R₂ being carboxymethyl when said Q represents an oxygen, sulfur or selenium atom; and Z represents the nonmetallic atoms necessary to complete a heterocyclic nucleus containing from 5 to 6 atoms in the heterocyclic ring, which nucleus may contain a second hetero atom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4 - chlorobenzothiazole, 5-chlorobenzothiazole, 6 - chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naphtho[1,2-d]thiazole, naphtho[2,3 - d]thiazole, 5 - methoxynaphtho[2,3-d]thiazole, 5 - ethoxynaphtho[1,2 - d]thiazole, 8-methoxynaphtho[2,1 - d]thiazole, 7 - methoxynaphtho[2,1 - d]thiazole, 4'-methoxythianaphtheno-7',6',4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethoxazole, 5-phenyloxazole, benzoxazole, 5-chlorobenzoxazole, 5-methylbenzoxazole, 5-phenylbenzoxazole, 6 - methylbenzoxazole, 5,6 - dimethylbenzoxazole, 4,6-dimethylbenzoxazole, 5-methoxybenzoxazole, 5-ethoxybenzoxazole, 5 - chlorobenzoxazole, 6 - methoxybenzoxazole, 5 - hydroxybenzoxazole, 6 - hydroxybenzoxazole, naphth[2,1-d]oxazole, naphth[1,2-d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphth[2,1-d]selenazole, naphth[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6 - methoxy - 2-quinoline, 8-ethoxy-2-quinoline, 8 - hydroxy - 2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylindolenine nucleus, e.g., 3,3-dialkylindolenine, 3,3-dimethylindolenine, 3,3-dibutylindolenine, etc.; and, an imidazole nucleus e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1 - alkyl - 1H - naphth[1,2 - d]imidazole, 1-aryl-3H-naphth[1,2-d]imidazole, 1-alkyl - 5 - methoxy-1H-naphth[1,2-d]imidazole, etc.; and like nuclei of the type employed in cyanine dyes.

Typical merocyanine dyes embraced by Formula I above includes:

(I) 1-carboxymethyl-5-[(3-ethyl-2-benzoxazolinylidene) ethylidene]-3-phenyl-2-thiohydantoin

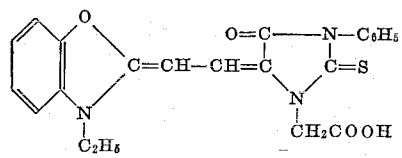

(II) 3-carboxymethyl-5-(3-ethyl-2-benzothiazolinylidene) rhodanine

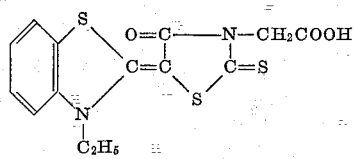

(III) 3-carboxymethyl-5-(1-methyl-2-(1H)-pyridylidene) rhodanine

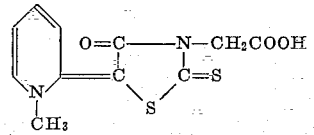

(IV) 3-carboxymethyl-5-(3-methyl-2-benzoxazolinylidene) rhodanine

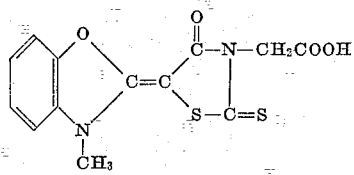

(V) 3-carboxymethyl-5-(1-ethyl-2(1H)-quinolylidene) rhodanine

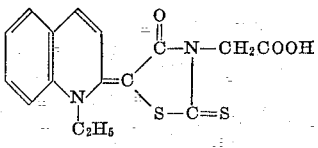

(VI) 3-carboxymethyl-5-(1-ethyl-4(1H)-quinolylidene) rhodanine

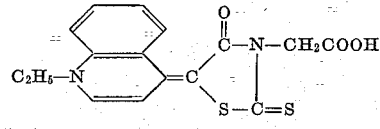

(VII) 3-carboxymethyl-5-(1-ethylnaphtho[1,2-d] thiazolin-2-ylidene)rhodanine

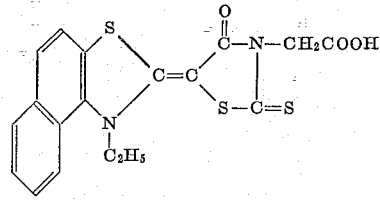

(VIII) 3-carboxymethyl-5-[(3-methyl-2-thiazolidinylidene) 1-methylethylidene]rhodanine

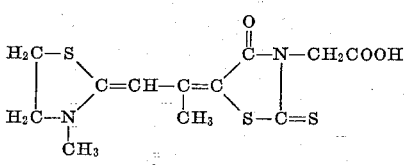

(IX) 3-carboxymethyl-5-[(3-ethoxycarbonylmethyl-2-thiazolidinylidene)-1-methylethylidene]rhodanine

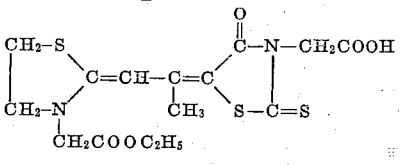

(X) 3-carboxymethyl-5-[(3-ethyl-5-phenyl-4-oxazolin-2-ylidene)ethylidene]rhodanine

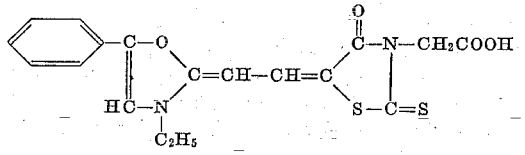

(XI) 3-carboxymethyl-5-[(3-ethyl-2-benzoxazolinylidene)ethylidene]-2-thio-2,4-oxazolidinedione

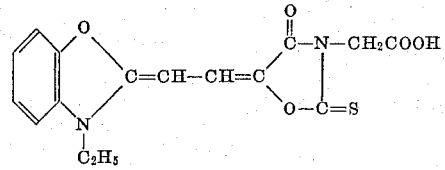

(XII) 1-carboxymethyl-5-[(3-methyl-2-thiazolindinylidene)-ethylidene]-3-phenyl-2-thiohydantoin

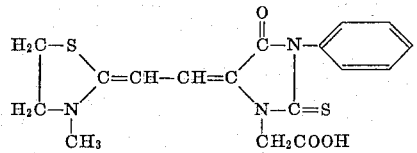

(XIII) 3-carboxymethyl-5-[(3-ethyl-2-benzoxazolinylidene)-ethylidene]rhodanine

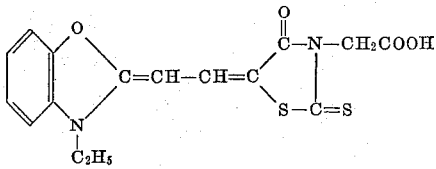

(XIV) 3-carboxymethyl-5-[3-ethyl-2-benzothiazolinylidene)-ethylidene]-1-methyl-2-thiohydantoin

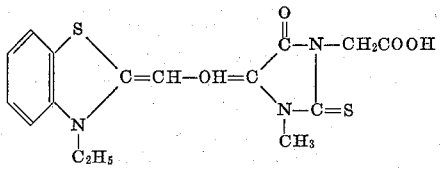

(XV) 3-carboxymethyl-5-[3-ethyl-2-benzothiazolinylidene)-ethylidene]-1-phenyl-2-thiohydantoin

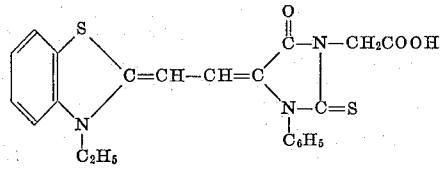

(XVI) 1-carboxymethyl-5-[(3-ethyl-2-benzoselenazolinylidene)-ethylidene]-3-methyl-2-thiohydantoin

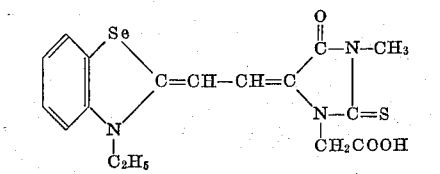

(XVII) 3-carboxymethyl-1-(4-carboxyphenyl)-5-[(3-ethyl-2-benzoxazolinylidene)ethylidene]-2-thiohydantoin

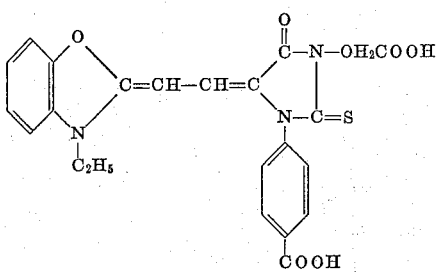

(XVIII) 3-(4-carboxyphenyl)-1-ethoxycarbonylmethyl-5-[(3-ethyl-2-benzothiazolinylidene)ethylidene]-2-thiohydantoin

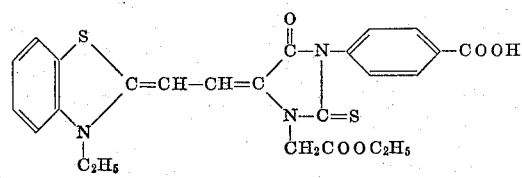

(XIX) 3-(4-carboxyphenyl)-1-ethoxycarbonylmethyl-5-[(3-ethyl-2-benzoselenazolinylidene)ethylidene]-2-thiohydantoin

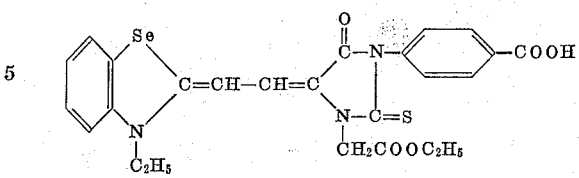

The above Dyes I to XIX can be readily prepared as described in Brooker and White, U.S. Pat. 2,493,747, issued Jan. 10, 1950, and Brooker and Keyes, U.S. Pat. 2,493,748, issued Jan. 10, 1950.

Suitable water-soluble block copolymers for preparing the novel and improved lithographic silver halide emulsions and elements of the invention include the water-polyethylene oxide-polypropylene oxide block copolymers in which the polyoxypropylene chain (or moiety) has an average molecular weight between 800 and 3,000 and in which the polyoxyethylene units constitute from about 10 to about 70 percent by weight of the polymer. The image reproductions produced in my "lith-type" emulsion layers are of excellent quality. Although the conventional alkaline, pure hydroquinone, low free-sulfite developer may be used to develop my exposed elements, it is also advantageous to use a developer having from 10 to about 30 grams of an alkali sulfite per liter of the developer solution. When my elements are developed in the preferred developer solutions not only is the image contrast high and the dot quality excellent but this excellent quality is produced over a wide range of exposures and development times.

The water-soluble block copolymers of polyoxypropylene and polyoxyethylene used to advantage according to my invention include those represented by the formula:

(II) $\quad Y[(D)_n—E—R]_x$ wherein Y represents an organic radial having a valence of $x$, said radical being the residue of an organic compound containing atoms selected from the class consisting of carbon, hydrogen, oxygen, nitrogen and sulfur with $x$ active hydrogen atoms, such as, the residue of polyhydroxy compounds, e.g., ethylene glycol, 1,2-propanediol, 1,5-pentanediol, 1,2,3-propanetriol, sucrose, etc., the residue of a polybasic acid, e.g., oxalic acid, malonic acid, succinic acid, maleic acid, citric acid, etc., the residue of a polyamine, e.g., ethylenediamine, 1,3-diaminopropylene, etc., the residue of a polyamide, e.g., malonamide, succinamide, etc., the residue of a polythiol, e.g., 1,2-ethylenedithiol, 1,3-propylenedithiol, etc.; $n$ is an integer greater than 1; $x$ is an integer greater than 1, so that the values of $n$ and $x$ are such that the molecular weight of the said polymer exclusive of Y, E and R is between 800 and 3,000; E represents a polyoxyethylene chain constituting from about 10 to about 70 percent by weight of said block polymer; and R represents the hydrogen atom, an alkyl group having from 1 to 20 carbon atoms (such as methyl, propyl, decyl, dodecyl, octadecyl, etc.), an alkyl carbonyl group in which the alkyl group has from 1 to 20 carbon atoms as described above, an aryl carbonyl group, such as, benzoyl, p-methyl benzoyl, etc.; and, D represents polyoxypropylene.

Included among the preferred block copolymers are those having the formula:

(III) $\quad HO(CH_2CH_2O)_a\left[\begin{array}{c}CHCH_2O\\|\\CH_3\end{array}\right]_b(CH_2CH_2O)_cH$ in which $b$ represents an integer of from 14 to 52; $a$ and $c$ are each integers such that the sum of $a+c$ has a total of from 4 to 48 and the polyoxyethylene groups constitute between 10 and 70 percent by weight of the block copolymer.

The block copolymers of Formula III and of Formula II where R represents the hydrogen atom are described in Lundsted U.S. Pat. 2,674,619, issued Apr. 6, 1954, and Lundsted U.S. Pat. 3,022,335, issued Feb. 20, 1962. The block copolymers of Formula II in which R is hydrogen are readily converted to compounds where R represents an organic residue by reaction with the appropriate reagent in a suitable inert organic solvent that is preferably anhydrous. For example, alkyl halides, such as alkyl chlorides, alkyl bromides, etc., are used to advantage to replace the terminal hydrogen atom of the block copolymer with an alkyl group. Alkyl-p-toluenesulfonates are also used to advantage to place an alkyl group on the end of the block polymers. The appropriate acid chloride or acid anhydride, such as, acetyl chloride, propionyl chloride, stearoyl chloride, benzoyl chloride, acetic anhydride, etc., are used to advantage to prepare block copolymers of Formula II in which R is an alkyl carbonyl or an aryl carbonyl group. These reactions are well known to those skilled in the art. Many of the block copolymers of Formulas II and III are available commercially.

Included among the block copolymers used to advantage according to my invention are the following typical polymers (restrainers) used for illustrative purposes.

| Restrainer or block polymer No. | Y Group derived from | Average value of $n$ in Formula II | Percent polyoxyethylene by weight of block polymer |
| --- | --- | --- | --- |
| 1 | 1,2-propanediol | 30 | 10 |
| 2 | do | 30 | 20 |
| 3 | do | 22 | 40 |
| 4 | do | 30 | 50 |
| 5 | do | 30 | 40 |
| 6 | do | 47 | 20 |
| 7 | do | 39 | 10 |
| 8 | 1,5-pentanediol | 24 | 50 |
| 9 | 1,2,3-propanetriol | 36 | 48 |
| 10 | Ethylenediamine | 32 | 50 |

These block copolymers are available commercially. For example, block copolymers 1–7 are manufactured by Wyandotte Chemical Co., and sold under the trade name Pluronic L61, L62, L44, P65, L64, L92 and L81, respectively.

Other water-soluble block copolymers that can be used with advantage for preparing the novel and improved lithographic silver halide emulsions and elements of the invention include those comprising blocks of polyoxyethylene and polyoxypropylene, about 10 to 70% by weight of said copolymer being polyoxyethylene and the average molecular weight of the polyoxypropylene in said copolymer being in the range of about 800 to 3000, said block copolymer containing up to about 15 percent by weight of silicon atoms in the main polymer chain. These organosilicon block copolymers are prepared by reacting a polypropylene oxide-polyethylene oxide block copolymer such as defined in the foregoing Formulas II and III with dimethyl siloxane. Further details concerning their preparation can be had by reference to K. M. Milton, U.S. Pat. 3,294,537, issued Dec. 27, 1966. Useful organosilicone block copolymers are also described in E. L. Morehouse, Canadian Pat. 746,550, issued Nov. 15, 1966.

In accordance with the invention, novel and improved lithographic type silver halide emulsions are prepared by incorporating one or more of the above-defined merocyanine dyes and one or more of the above defined block copolymers into an aqueous hydrophilic colloid either before or after the silver halide is added. Advantageously, however, the dyes and block copolymers are incorporated in the washed, finished silver halide emulsion and should, of course, be uniformly distributed throughout the emulsion. The methods of incorporating dye and other addenda in emulsions are relatively simple and well known to those skilled in the art of emulsion making. For example, it is convenient to add them from solutions in appropriate solvent, in which case the solvent selected should be completely free from any deleterious effect on the ultimate light-sensitive materials. Methanol, isopropanol, pyridine, water, etc., alone or in admixtures have proven satisfactory as solvents for this purpose. The block copolymers of the invention are advantageously added in aqueous solutions or dispersions.

The fine grain silver halide emulsions used to advantage include emulsions containing, for example, silver chloride, -bromide, -chlorobromide, -iodobromide, iodochloride, etc., and mixtures thereof. The preferred emulsions have silver halide crystals containing at least 50 mole percent chloride, less than 40 mole percent bromide and less than about 5 mole percent iodide. Such emulsions can be prepared as described by MacWilliam, U.S. Pat. 2,756,148, issued July 24, 1956. Particularly useful are the fine grain gelatino silver chlorobromide emulsions containing at least 50 mole percent chloride. These emulsions may be used in the absence of other sensitizing dyes; however, in some cases it may be advantageous to utilize additional known sensitizing dyes to impart the desired spectral sensitivity.

The silver halide is dispersed in hydrophilic colloid materials used as binders, including gelatin, collodion, gum arabic, cellulose ester derivatives, such as alkyl esters of carboxylated cellulose, hydroxy ethyl cellulose, carboxy methyl hydroxy ethyl cellulose, synthetic resins, such as the amphoteric copolymers described by Clavier et al. in U.S. Pat. 2,949,442, issued Aug. 16, 1960, polyvinyl alcohol, and others well known in the art. Examples of useful polymeric gelatin substitutes are copolymers of allylamine and methacrylic acid; copolymers of allylamine, acrylic acid and acrylamide; hydrolyzed copolymers of allylamine, methacrylic acid and vinyl acetate; the copolymers of allylamine, acrylic acid and styrene; the copolymers of allylamine, methacrylic acid and acrylonitrile; alkyl acrylate-acrylic acid copolymer, e.g., copolymers of butyl acrylate-acrylic acid, etc.; and etc.

It is advantageous to add certain onium salts, such as, quaternary ammonium salts, sulfonium salts and phosphonium salts to my light-sensitive emulsions in order to increase the photographic speed without adversely affecting the improved dot quality, contrast and evenness of development. Examples of quaternary ammonium salts include nonyl pyridinium perchlorate, hexoxymethyl pyridinium perchlorate, ethylene bis-dioxymethyl pyridinium perchlorate and others described by Carroll U.S. 2,271,623, issued Feb. 3, 1942, hexadecamethylene-1,16-bis(pyridinium perchlorate), 9,16 - diaza - 7,18 - dioxa-8,17 - dioxotetracosane - 1,24 - bis(pyridinium perchlorate), and others of Beavers et al. U.S. 2,944,898, issued July 12, 1960. Other examples include the onium salts of polyoxyalkylenes of Carroll et al. U.S. 2,944,902, issued July 12, 1960, the polyonium salts of Carroll et al. U.S. 2,288,226, issued June 30, 1942, such as bis(lauryl methyl sulfonium p-toluenesulfonate) 1,2-ethane, N,N'-trimethylene dioxymethyl pyridinium perchlorate, etc., the sulfonium salts of Carroll et al. U.S. 2,275,727, issued Mar. 10, 1942, such as, n-decyl dimethyl sulfonium p-toluenesulfonate, n-nonyl dimethyl sulfonium p-toluenesulfonate, etc., and the phosphonium salts of Carroll et al. U.S. 2,271,622, issued Feb. 3, 1942, such as, tetramethylene bis-triethyl phosphonium bromide, lauryltriethylphosphonium bromide, etc.

The combinations of my invention are also effective in obtaining the improvements described above in photographic emulsions which are sensitized with various chemical sensitizers; or which contain various incorporated developers such as 3-pyrazolidone developers, etc.

My light-sensitive emulsions can be coated to advantage on any of the conventional photographic supports, including glass, cellulose acetate, polystyrene, polyalkyleneterephthalate, etc. The block copolymers can be coated advantageously in the silver halide emulsion layer, or in a hydrophilic colloid layer that is either under or over the silver halide emulsion layer so that the block polymer is contiguous to the silver halide.

The invention is still further illustrated by the following examples.

EXAMPLE 1

This example illustrates that improved time-development curves are obtained with the novel lithographic silver halide emulsions of the invention containing a combination of the above defined merocyanine dyes and block copolymers of the invention. Results recorded in Table 1 below fall into three categories designated types 1, 2 and 3. Type 1 indicates none or very little "lith" effect, "lith" effect being high contrast, sharp toe and high dot quality; Type 2 indicates improvement in "lith" effect at some development times, but poor spacing of the curves; while Type 3 indicates ideal curves with good "lith" effect and even spacing of the curves over the entire time-development range. The tests are conducted as follows:

A fine grain silver chlorobromoiodide gelatin emulsion containing 90 mole percent chloride, 9 mole percent bromide and 1 mole percent iodide is chemically sensitized with sulfur and gold compounds and divided into separate portions and the amount and type of polymeric restrainer and dyes are added as indicated in Table 1 hereinafter. The resulting compositions are then coated on separate pieces of poly(ethyleneterephthalate) film support at a coverage 470 mg. of silver and 466 mg. of gelatin per square foot. A gelatin overcoat is next coated over the emulsion layer at a coverage of 82.5 mg. of gelatin per square foot. Samples of each coating are then exposed, using tungsten illumination, to a step wedge through a magenta contact screen of the type described in "How to Use the Kodak Magenta Contact Screen" Eastman Kodak Co. Pamphlet No. Q–21, 1956, and processed in a developer of the composition:

| | G. |
|---|---|
| Sodium sulfite, desiccated | 120.0 |
| Paraformaldehyde | 30.0 |
| Potassium metabisulfite | 10.5 |
| Boric acid crystals | 30.0 |
| Hydroquinone | 90.0 |
| Potassium bromide | 6.3 |
| Water to make 4.0 liters. | | then fixed, washed and dried.

TABLE 1

| Sample: | Dye,[1] mg./Ag mole | Restrainer, mg./Ag mole | Type of curves |
|---|---|---|---|
| (a) | None | None | 1 |
| (b) | I(132) | do | 1 |
| (c) | None | PEG(30)[2] | 1 |
| (d) | do | PEG(125) | 2 |
| (e) | do | 5(30) | 1 |
| (f) | I(132) | PEG(30) | 1 |
| (g) | I(132) | PEG(125) | 2 |
| (h) | I(132) | 5(30) | 3 |
| (i) | A(121) | 5(35) | 1 |
| (j) | A(121) | 5(75) | 2 |
| (k) | A(121) | 5(115) | 2 |
| (l) | B(125) | 5(30) | 1 |
| (m) | I(70) | PEG(125) | 2 |
| (n) | I(132) | PEG(125) | 2 |
| (o) | I(190) | PEG(125) | 2 |
| (p) | I(70) | 5(35) | 2 |
| (q) | I(132) | 5(35) | 3 |
| (r) | I(190) | 5(35) | 3 |

[1] Dye Identification:
Dye I. A dye of the invention defined by Formula I above, 1-carboxymethyl-5-[(3-ethyl-2-benzoxazolinylidene)-ethylidene]-3-phenyl-2-thiohydantoin.
Dye A. A comparison dye outside of the invention, 3-ethyl-5-[(3-ethyl-2-benzoxazolinylidene)ethylidene]-1-phenyl-2-thiohydantoin.
Dye B. A comparison dye outside of the invention, 3-ethyl-5-[1-(4-sulfobutyl)-4-(1H)-pyridylidene]rhodanine sodium salt.
[2] PEG. An abbreviation for oleyl ether of polyethylene glycol. Restrainer 5 is identified above.

In the above table, the curves referred to are time-development H and D curves. Curves in category 1 show no or very little "lith" effect at different development times "lith" effect being high contrast, sharp toe and high dot quality; curves in category 2 show somewhat improved "lith" effect at certain development times, but the curves are uneven at the various development times; and, curves in category 3 show good "lith" effect over a wide range of development times.

Referring to above Table 1, it will be noted that only the combinations of the invention comprising Dye 1 and restrainer No. 5, represented by Samples (h), (q) and (r), give the ideal time-development curves of desired type 3. In comparison the control, Dye 1 alone, restrainer 5 alone, and PEG alone at 30 mg. concentration, designated Samples (a), (b), (c) and (e), respectively, give the least desirable curves of type 1. At the much higher concentartion of 125 mg. PEG (Sample (d)) a curve of type 2 is attained. However, combinations of PEG with Dye 1 (at any concentration of PEG) shows no improvement as indicated by Samples (f), (g), (m), (n) and (o). It will be further noted that comparison Dyes A and B outside the invention) in combination with restrainer 5 of the invention, designated as Samples (i), (j), (k) and (l), result in curves limited to types 1 and 2 at any concentrations.

EXAMPLE 2

This example illustrates further the improved "lith" effect obtained with the novel emulsions and elements of the invention. The relative speeds and effective contrasts of comparison tests are recorded in Table 2 below. Effective contrast is the average gradient of the optical density (D) of the image vs. Log E of exposure between two points which are 0.3 Log E apart, where the lower point has a density of 0.1 above fog; it is measured as the slope of a straight line between these points.

A fine grain silver chlorobromoiodide emulsion is prepared as described in above Example 1 and is similarly divided into portions with Dye I and restrainers 5 and PEG added thereto as indicated in Table 2, followed by the same coating, exposure and processing procedures.

TABLE 2

| | Dye, mg./Ag mole | Restrainer, mg./Ag mole | Relative speed | | | Eff. contrast | | |
|---|---|---|---|---|---|---|---|---|
| | | | 1¾′ | 2¾′ | 3¾′ | 1¾′ | 2¾′ | 3¾′ |
| Sample: | | | | | | | | |
| (a) | None | None | 257 | 355 | 550 | 4.7 | 4.0 | 3.8 |
| (b) | I(132) | do | 257 | 417 | 537 | 5.8 | 4.2 | 4.6 |
| (c) | None | PEG(30) | 246 | 380 | 617 | 4.8 | 3.9 | 3.6 |
| (d) | do | PEG(125) | 89 | 234 | 447 | 11.5 | 9.5 | 5.8 |
| (e) | do | 5(30) | 240 | 347 | 550 | 4.7 | 3.7 | 3.7 |
| (f) | I(132) | PEG(30) | 224 | 407 | 537 | 6.5 | 4.5 | 4.4 |
| (g) | I(132) | PEG(125) | 65 | 186 | 347 | 15.0 | >16.0 | 14.5 |
| (h) | I(132) | 5(30) | 100 | 126 | 204 | >16.0 | >16.0 | >16.0 |

These results show that the combination of a low level of restrainer 5 with a merocyanine dye (Dye 1) of the invention produces a superior lithographic emulsion and element, as seen especially by the evenly spaced time-development curves and the uniformly high effective contrast (Sample (h) in above Table 2). Also, it will be further seen that not as good "lith" effect is obtained with the comparison restrainer PEG even in combination with the same sensitizing dye (Sample (f) and (g) in above Table 2).

EXAMPLE 3

This example illustrates that not all sensitizing merocyanine dyes give a good "lith" effect, even in combination at relatively high levels of restrainer 5. The following Table 3 compares relative speeds, effective contrasts and dot qualities of various samples containing Dye A and Dye B (dyes outside of the invention) in combination with restrainer 5.

A fine grain silver chlorobromoiodide emulsion is prepared as described in above Example 1 and is similarly divided into portions with Dyes A, B and I and restrainers PEG and 5 added thereto as indicated in Table 3, followed by the same coating, exposure and processing procedures.

TABLE 3

| Sample | Dye, mg./Ag mole | Restrainer, mg./Ag mole | Relative speed | | | | Eff. contrast | | | | Dot quality | | | |
|---|---|---|---|---|---|---|---|---|---|---|---|---|---|---|
| | | | 1¾' | 2¾' | 3¾' | 4¾' | 1¾' | 2¾' | 3¾' | 4¾' | 1¾' | 2¾' | 3¾' | 4¾' |
| (a) | A(121) | 5(35) | 646 | 912 | 1,005 | 1,150 | 6.3 | 3.4 | 2.9 | 3.2 | 7 | 5 | 3 | 1 |
| (b) | A(121) | 5(75) | 407 | 676 | 891 | 1,005 | 8.0 | 6.4 | 4.5 | 3.5 | 7 | 3 | 1 | 1 |
| (c) | A(121) | 5(115) | 112 | 302 | 562 | 725 | 3.9 | 10.3 | 10.8 | 8.0 | 7 | 8 | 7 | 4 |
| (d) | B(125) | 5(30) | 363 | 537 | 661 | | 6.2 | 4.7 | 4.5 | | Not Available | | | |

EXAMPLE 4

This example shows the advantageous results produced with the dye and restrainer combinations (Dye 1 plus restrainer 5) of the invention as compared with combinations of Dye 1 with the prior art restrainer PEG.

A fine grain silver chlorobromoiodide emulsion is prepared as described in above Example 1 and is similarly divided into portions with Dye 1 and restrainers 5 and PEG added thereto as indicated in Table 4, followed by the same coating, exposure and processing procedures.

TABLE 4

| Sample | Dye, mg./Ag mole | Restrainer, mg./Ag mole | Relative speed | | | | Eff. contrast | | | | Dot quality | | | |
|---|---|---|---|---|---|---|---|---|---|---|---|---|---|---|
| | | | 2¼' | 2¾' | 3¼' | 3¾' | 2¼' | 2¾' | 3¼' | 3¾' | 2¼' | 2¾' | 3¼' | 3¾' |
| (a) | I(70) | PEG(125) | 118 | 195 | 276 | 331 | 7.3 | 12.0 | 12.3 | 12.0 | 8 | 8 | 7 | 7 |
| (b) | I(32) | PEG(125) | 115 | 191 | 289 | 363 | 7.2 | 10.2 | 12.2 | 14.0 | 7 | 8 | 7 | 6 |
| (c) | I(190) | PEG(125) | 120 | 209 | 302 | 417 | 6.4 | 9.5 | 11.0 | 12.5 | 8 | 8 | 7 | 7 |
| (d) | I(70) | 5(35) | 295 | 363 | 389 | 447 | 7.7 | 7.7 | 7.8 | 7.2 | 6 | 6 | 6 | 5 |
| (e) | I(132) | 5(35) | 138 | 162 | 191 | 229 | 9.4 | 11.0 | 13.0 | 12.3 | 8 | 8 | 8 | 8 |
| (f) | I(190) | 5(35) | 95 | 118 | 151 | 162 | 10.8 | 12.9 | 12.2 | 10.5 | 8 | 8 | 8 | 8 |

It will be noted from above Table 4 that there is very little change in relative speed, effective contrast and dot quality as the amount of dye is changed with PEG as the restrainer, whereas there is a great change, especially in relative speed and effective contrast as the amount of dye is changed with polymer 5 as the restrainer, indicating an interaction that is not present between dye and PEG.

Dot quality in above Tables 3 and 4 is a measure of the quality of the reproduction of a half-tone image. "Lithtype" photographic elements exposed to a half-tone image, and developed, produce areas commonly referred to as shadow dots and areas known as highlight areas. Intermediate between these two extremes are areas of varying size. The dot quality used herein is a measure of the areas referred to as 50% dots (i.e., ½ clear and ½ developed density) and is expressed in a progressive scale where "9" is excellent and "1" is extremely poor. A 50% dot quality below "6" is generally not acceptable.

The evaluation tests described in above Examples 1, 2 and 4 are repeated using in place of the specified Dye 1 like amounts of the aforementioned Dyes II to XIX of the invention. The results obtained are found to be generally similar and the conclusions drawn therefrom the same, namely, that the dye and block copolymer type restrainer combinations of the invention produce greatly improved lithographic silver halide emulsions and elements. For example, the dot quality using Dyes II to XIII, XVIII or XIX in the combinations of the invention repeating Samples (e) and (f) of above Example 4 with these dyes are "8" over the entire time-development range, whereas these same dyes in combination with PEG restrainer on repeats of Samples (a), (b) and (c) of Example 4 show the same uneven dot quality. In this connection, it is to be noted again that relatively low levels of restrainer 5 in the dye combinations of the invention produce manifestly better dot quality, as well as other improved "lith" effects, than do much greater amounts (>3 times) of PEG restrainer in combinations with the same sensitizing dyes.

A block copolymer similar to restrainer 5, except that it contains about 10% by weight silicon in the polymer chain, is substituted for restrainer 5 in evaluation tests described in Examples 1-4. Similar results are obtained. Also, results similar to those of Examples 1-4 are obtained when restrainer 5 is replaced with like quantities of restrainers 1-4 and 6-10.

The invention has been described in detail with particular reference to preferred embodiments thereof, but it will be understood that variations and modifications can be effected within the spirit and scope of the invention as described hereinabove and as defined in the appended claims.

I claim:

1. A photographic silver halide emulsion in which the halide comprises at least 50 mole percent chloride, said emulsion containing a combination of (1) a merocyanine dye comprising first and second 5- to 6-membered nitrogen containing heterocyclic nuclei joined by a linkage selected from the group consisting of a double bond and a dimethine linkage; the first of said nuclei being selected from the group consisting of a rhodanine nucleus, a 2-thiohydantoin nucleus and a 2-thio-2,4-oxazolidinedione nucleus, said first nucleus containing a substituent selected from the group consisting of a carboxymethyl group and a carboxyphenyl group on a hetero nitrogen atom thereof, and said first nucleus being joined by the 5-carbon atom thereof to said linkage; and, said second nucleus being a 5 to 6 member nitrogen containing heterocyclic nucleus of the type used in cyanine dyes joined by a carbon atom thereof to said linkage, to complete said merocyanine dye; and (2) a water-soluble block copolymer of polyoxyethylene and polyoxypropylene, about from 10 to 70% by weight of said copolymer being polyoxyethylene and the average molecular weight of polyoxypropylene in said copolymer being in the range of about from 800 to 3000.

2. A silver halide emulsion in accordance with claim 1 wherein said block copolymer contains up to about 15 percent by weight of silicon atoms in the main polymer chain.

3. A photographic silver halide emulsion in which the halide comprises at least 50 mole percent chloride, said emulsion containing a combination of (1) a merocyanine dye represented by the following general formula:

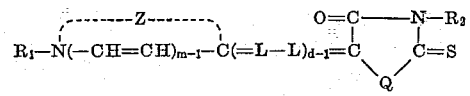

wherein $m$ and $d$ each represents a positive integer of from 1 to 2; L represents a methine linkage; $R_1$ represents a member selected from the group consisting of an alkyl group, an aralkyl group, an alkenyl group and an aryl group; $R_2$ represents a member selected from the group consisting of a methyl group, a carboxymethyl group, a phenyl group, an alkoxy carbonylmethyl group, and a carboxyphenyl group; Q represents a member selected from the group consisting of an oxygen atom, a sulfur atom, a selenium atom, and the group $=NR_3$ wherein $R_3$ is selected from the group consisting of methyl, phenyl, carboxymethyl, carboxyphenyl and alkoxy carbonylmethyl, said $R_3$ being (1) phenyl or methyl when $R_2$ represents carboxymethyl; (2) carboxymethyl when $R_2$ represents phenyl or methyl; (3) alkoxy carbonylmethyl when $R_2$ represents carboxyphenyl; and (4) carboxyphenyl when $R_2$ represents alkoxymethyl; said $R_2$ being carboxymethyl when said Q represents an oxygen, sulfur or selenium atom; and Z represents the nonmetallic atoms necessary to complete a heterocyclic nucleus containing from 5 to 6 atoms; and (2) a water-soluble block copolymer of the formula:

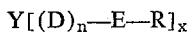

wherein Y represents an organic radical having a valence of $x$; $n$ is an integer; $x$ is an integer greater than 1, so that the values of $n$ and $x$ are such that the molecular weight of the said polymer exclusive of Y, E and R is between 800 and 3000; E represents a polyoxyethylene chain constituting from about 10 to about 70 percent by weight of said polymer; R is a member selected from the class consisting of the hydrogen atom, an alkyl group, an alkyl carbonyl group, and an aryl carbonyl group; and, D represents polyoxypropylene.

4. A silver halide emulsion in accordance with claim 3 wherein said block copolymer contains up to about 15 percent by weight of silicon atoms in the main polymer chain.

5. A silver halide emulsion in accordance with claim 3 wherein said block copolymer has the formula:

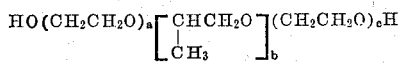

wherein $b$ represents an integer of from 14 to 52; and $a$ and $c$ each represent integers such that the sum of $a+c$ represents an integer of from 4 to 48 and the polyoxyethylene groups constitute between 10 and 70 percent by weight of said copolymer.

6. A silver halide emulsion in accordance with claim 3 wherein said combination comprises about from 50 to 250 mg. of the dye (1) and from 20 to 50 mg. of the block copolymer (2) per mole of silver in said emulsion.

7. A silver halide emulsion in accordance with claim 3 wherein said emulsion contains a compatible onium salt.

8. A silver halide emulsion in accordance with claim 3 wherein said dye (1) is selected from the group consisting of 1-carboxymethyl-5-[(3-ethyl-2-benzoxazolinylidene)-ethylidene]-3-phenyl-2-thiohydantoin,
3-carboxymethyl-5-(3-ethyl-2-benzothiazolinylidene) rhodanine,
3-carboxymethyl-5-(1-methyl-2(1H)-pyridylidene) rhodanine,
3-carboxymethyl-5-(3-methyl-2-benzoxazolinylidene) rhodanine,
3-carboxymethyl-5-(1-ethyl-2(1H)-quinolylidene) rhodanine,
3-carboxymethyl-5-(1-ethyl-4(1H)-quinolylidene) rhodanine,
3-carboxymethyl-5-(1-ethylnaphtho[1,2-d]thiazolin-2-ylidene)rhodanine,
3-carboxymethyl-5-[(3-methyl-2-thiazolidinylidene)-1-methylethylidene]rhodanine,
3-carboxymethyl-5-[(3-ethoxycarbonylmethyl-2-thiazolidinylidene)-1-methylethylidene]rhodanine,
3-carboxymethyl-5-[(3-ethyl-5-phenyl-4-oxazolin-2-ylidene)ethylidene]rhodanine,
3-carboxymethyl-5-[(3-ethyl-2-benzoxazolinylidene) ethylidene]-2-thio-2,4-oxazolidinedione,
1-carboxymethyl-5-[(3-methyl-2-thiazolidinylidene) ethylidene]-3-phenyl-2-thiohydantoin,
3-carboxymethyl-5-[(3-ethyl-2-benzoxazolinylidene) ethylidene]rhodanine,
3-(4-carboxyphenyl)-1-ethoxycarbonylmethyl-5-[(3-ethyl-2-benzothiazolinylidene)ethylidene]-2-thiohydantoin,
3-(4-carboxyphenyl)-1-ethoxycarbonylmethyl-5-[(3-ethyl-2-benzoselenazolinylidene)ethylidene]-2-thiohydantoin,
3-carboxymethyl-5-[3-ethyl-2-benzothiazolinylidene) ethylidene]-1-methyl-2-thiohydantoin,
3-carboxymethyl-5-[3-ethyl-2-benzothiazolinylidene) ethylidene]-1-phenyl-2-thiohydantoin,
1-carboxymethyl-5-[(3-ethyl-2-benzoselenazolinylidene) ethylidene]-3-methyl-2-thiohydantoin, and
3-carboxymethyl-1-(4-carboxyphenyl)-5-[(3-ethyl-2-benzoxazolinylidene)ethylidene]-2-thiohydantoin.

9. A silver halide emulsion in accordance with claim 3 wherein said emulsion is a gelatino silver chlorobromide emulsion containing approximately 90 mole percent chloride, approximately 9 mole percent bromide and approximately 1 mole percent iodide, wherein said dye (1) is 1-carboxymethyl - 5 - [(3-ethyl - 2 - benzoxazolinylidene) ethylidene]-3-phenyl-2-thiohydantoin, and wherein said block copolymer (2) comprises a polyoxypropylene chain having polyoxyethylene groups at each end of said block polymer in which the molecular weight of the polyoxypropylene chain is about 1750 and the polyethylene groups constitute approximately 40 percent by weight of said copolymer.

10. A photographic element comprising a support having thereon a photographic silver halide emulsion layer in which the halide comprises at least 50 mole percent chloride, said emulsion containing a combination of (1) a merocyanine dye comprising first and second 5- to 6- membered nitrogen containing heterocyclic nuclei joined by a linkage selected from the group consisting of a double bond and a dimethine linkage; the first of said nuclei being selected from the group consisting of a rhodanine nucleus, a 2-thiohydantoin nucleus and a 2-thio-2,4-oxazolidinedione nucleus, said first nucleus containing a substituent selected from the group consisting of a carboxymethyl group and a carboxyphenyl group on a hetero nitrogen atom thereof, and said first nucleus being joined by the 5-carbon atom thereof to said linkage; and, said second nucleus being a 5 to 6 member nitrogen containing heterocyclic nucleus of the type used in cyanine dyes joined by a carbon atom thereof to said linkage, to complete said merocyanine dye; and (2) a water-soluble block copolymer of polyoxyethylene and polyoxypropylene, about from 10 to 70% by weight of said copolymer being polyoxyethylene and the average molecular weight of polyoxypropylene in said copolymer being in the range of about from 800 to 3000.

11. A photographic element in accordance with claim 10 wherein said block copolymer contains up to about 15 percent by weight of silicon atoms in the main polymer chain.

12. A photographic element comprising a support having thereon a photographic silver halide emulsion layer in which the halide comprises at least 50 mole percent chloride, said emulsion containing a combination of (1) a merocyanine dye represented by the following general formula:

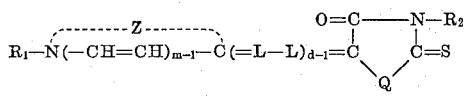

wherein $m$ and $d$ each represents a positive integer of from 1 to 2; L represents a methine linkage; $R_1$ represents a member selected from the group consisting of an alkyl group, an aralkyl group, an alkenyl group and an aryl group; $R_2$ represents a member selected from the group consisting of a methyl group, a carboxymethyl group, a phenyl group, an alkoxy carbonylmethyl group, and a carboxyphenyl group; Q represents a member selected from the group consisting of an oxygen atom, a sulfur atom, a selenium atom, and the group $=NR_3$ wherein $R_3$ is selected from the group consisting of methyl, phenyl, carboxymethyl, carboxyphenyl and alkoxy carbonylmethyl, said R$_3$ being (1) phenyl or methyl when R$_2$ represents carboxymethyl; (2) carboxymethyl when R$_2$ represents phenyl or methyl; (3) alkoxy carbonylmethyl when R$_2$ represents carboxyphenyl; and (4) carboxyphenyl when R$_2$ represents alkoxymethyl; said R$_2$ being carboxymethyl when said Q represents an oxygen, sulfur or selenium atom; and Z represents the non-metallic atoms necessary to complete a sensitizing nucleus containing from 5 to 6 atoms; and (2) a water-soluble block copolymer of the formula:

$$Y[(D)_n-E-R]_x$$

wherein Y represents an organic radical having a valence of $x$; $n$ is an integer; $x$ is an integer greater than 1, so that the values of $n$ and $x$ are such that the molecular weight of the said polymer exclusive of Y, E and R is between 800 and 3000; E, represents a polyoxyethylene chain constituting from about 10 to about 70 percent by weight of said polymer; R is a member selected from the class consisting of the hydrogen atom, an alkyl group, an alkyl carbonyl group, and an aryl carbonyl group; and, D represents polyoxypropylene.

13. A photographic element in accordance with claim 12 wherein said block copolymer contains up to about 15 percent by weight of silicon atoms in the main polymer chain.

14. A photographic element in accordance with claim 12 wherein said block copolymer has the formula:

$$HO(CH_2CH_2O)_a\left[\begin{array}{c}CHCH_2O\\|\\CH_3\end{array}\right]_b(CH_2CH_2O)_cH$$

wherein $b$ represents an integer of from 14 to 52; and $a$ and $c$ each represent integers such that the sum of $a+c$ represents an integer of from 4 to 48 and the polyoxyethylene groups constitute between 10 and 70 percent by weight of said copolymer.

15. A photographic element in accordance with claim 12 wherein said combination comprises from about 50 to 250 mg. of said dye (1) and from about 20 to 50 mg. of said block copolymer (2) per mole of silver in said emulsion.

16. A photographic element in accordance with claim 12 wherein said emulsion contains a compatible onium salt.

17. A photographic element in accordance with claim 12 wherein said dye (1) is selected from the group consisting of 1-carboxymethyl-5-[(3-ethyl-2-benzoxazolinylidene) ethylidene]-3-phenyl-2-thiohydantoin,
3-carboxymethyl-5-(3-ethyl-2-benzothiazolinylidene) rhodanine,
3-carboxymethyl-5-(1-methyl-2-(1H)-pyridylidene) rhodanine,
3-carboxymethyl-5-(3-methyl-2-benzoxazolinylidene) rhodanine,
3-carboxymethyl-5-(1-ethyl-2(1H)-quinolylidene) rhodanine,
3-carboxymethyl-5-(1-ethyl-4(1H)-quinolylidene) rhodanine,
3-carboxymethyl-5-(1-ethylnaphtho[1,2-d]thiazolin-2-ylidene)rhodanine,
3-carboxymethyl-5-[(3-methyl-2-thiazolidinylidene)-1-methylethylidene]rhodanine,
3-carboxymethyl-5-[3-ethoxycarbonylmethyl-2-thiazolidinylidene)-1-methylidene]rhodanine,
3-carboxymethyl-5-[(3-ethyl-5-phenyl-4-oxazolin-2-ylidene)ethylidene]rhodanine,
3-carboxymethyl-5-[(3-ethyl-2-benzoxazolinylidene) ethylidene]-2-thio-2,4-oxazolidinedione,
1-carboxymethyl-5-[(3-methyl-2-thiazolidinylidene) ethylidene]-3-phenyl-2-thiohydantoin,
3-carboxymethyl-5-[(3-ethyl-2-benzoxazolinylidene) ethylidene]rhodanine,
3-(4-carboxyphenyl)-1-ethoxycarbonylmethyl-5-[(3-ethyl-2-benzothiazolinylidene)ethylidene]-2-thiohydantoin,
3-(4-carboxyphenyl)-1-ethoxycarbonylmethyl-5-[(3-ethyl-2-benzoselenazolinylidene)ethylidene]-2-thiohydantoin,
3-carboxymethyl-5-[3-ethyl-2-benzothiazolinylidene) ethylidene]-1-methyl-2-thiohydantoin,
3-carboxymethyl-5-[3-ethyl-2-benzothiazolinylidene) ethylidene]-1-phenyl-2-thiohydantoin,
1-carboxymethyl-5-[(3-ethyl-2-benzoselenazolinylidene) ethylidene]-3-methyl-2-thiohydantoin and
3-carboxymethyl-1-(4-carboxyphenyl)-5-[(3-ethyl-2-benzoxazolinylidene)ethylidene]-2-thiohydantoin.

18. A photographic element in accordance with claim 12 wherein said emulsion is a gelatino silver chlorobromide emulsion containing approximately 90 mole percent chloride, approximately 9 mole percent bromide and approximately 1 mole percent iodide, wherein said dye (1) is 1-carboxymethyl-5-[(3 - ethyl-2-benzoxalinylidene) ethylidene]-3-phenyl-2-thiohydantoin, and wherein said block copolymer (2) comprises a polyoxypropylene chain having polyoxyethylene groups at each end of said block polymer in which the molecular weight of the polyoxypropylene chain is about 1750 and the polyethylene groups constitute approximately 40 percent by weight of said copolymer.

References Cited
UNITED STATES PATENTS 2,828,203  3/1958  MacWilliam _____ 96—106X WILLIAM D. MARTIN, Primary Examiner

PO-1050
(5/69)

UNITED STATES PATENT OFFICE
CERTIFICATE OF CORRECTION

Patent No. 3,567,458            Dated March 2, 1971

Inventor(s) Kirby M. Milton

It is certified that error appears in the above-identified patent and that said Letters Patent are hereby corrected as shown below:

In column 16, line 11, "/3-" should be --- /(3- ---
(Claim 17 of application, line 12).

In column 16, line 12, "methylidene/" should be
--- -methylethylidene/ --- (Claim 17 of application, line 13

In column 16, line 41, "-benzoxalinylidene)" should be
--- -benzoxazolinylidene) --- (Claim 18 of application, line Signed and sealed this 3rd day of October 1972.

(SEAL)
Attest:

EDWARD M. FLETCHER, JR.                      ROBERT GOTTSCHALK
Attesting Officer                                Commissioner of Pa